United States Patent
Kessels et al.

(10) Patent No.: US 10,823,128 B1
(45) Date of Patent: Nov. 3, 2020

(54) AUTOMATIC ENGINE RESTART SYSTEM

(71) Applicant: PACCAR Inc, Bellevue, WA (US)

(72) Inventors: Johannes Theodorus Bernard Anna Kessels, Heide (NL); Michael Douglas Gerty, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 16/436,630

(22) Filed: Jun. 10, 2019

(51) Int. Cl.
    *F02N 11/08* (2006.01)
(52) U.S. Cl.
    CPC ...... *F02N 11/0833* (2013.01); *F02N 11/0822* (2013.01); *F02N 2200/061* (2013.01)
(58) Field of Classification Search
    CPC .. F02N 11/08; F02N 11/0833; F02N 11/0822; F02N 2200/061
    See application file for complete search history.

(56) References Cited

U.S. PATENT DOCUMENTS

| | | | |
|---|---|---|---|
| 7,610,143 B1 | 10/2009 | Boesch | |
| 9,731,698 B1 * | 8/2017 | Khafagy | ............. F02N 11/08 |
| 2019/0118656 A1 | 4/2019 | Hudson | |

FOREIGN PATENT DOCUMENTS

WO    2018/111453 A1    6/2018

* cited by examiner

Primary Examiner — Hieu T Vo
(74) Attorney, Agent, or Firm — Seed IP Law Group LLP

(57) ABSTRACT

Systems and methods for managing or controlling an automatic engine restart system of a vehicle are provided herein. The method is operative to disable automatic engine restarts during specified restart inhibit periods to improve the comfort of the operator of the vehicle and others near the vehicle (e.g., during hoteling) or to satisfy regulations (e.g. silent area or green zone). During times outside of the specified restart inhibit periods, the method may control the automatic restarts to provide a determined level of charge for a rechargeable electrical energy source (e.g., battery) of the vehicle at a time just prior to the restart inhibit period so that the electrical energy source will be able to power various loads for an extended time during the restart inhibit period. The system includes a local or remote user interface that allows various parameters to be programmed. The system may also include an energy management system that optimizes the automatic restarts to achieve various goals.

24 Claims, 4 Drawing Sheets

AUTOMATIC ENGINE RESTART SYSTEM

BACKGROUND

Technical Field

The present disclosure generally relates to vehicle energy management systems, and more particularly, to vehicle automatic engine restart systems.

Description of the Related Art

Various vehicles such as long-haul trucks, boats and recreational vehicles are equipped with electronic equipment that requires power when the vehicle is underway and when it is parked. Such equipment are often referred to as "hotel loads," and include heating and air conditioning, lighting, and appliances such as refrigerators, coffee makers and microwave ovens as well as so-called "infotainment systems," which may include a television, an entertainment system, telematics, navigation, etc.

Demands from these "hotel loads" occur both during engine on conditions, such as during operation of the truck over a route, or during engine off conditions, such as during rest periods. Various arrangements have been proposed to supply power to vehicle hotel loads. Arrangements for powering hotel loads generally fall into two basic categories: (1) auxiliary power units (APUs) or generator sets; and (2) electrical power systems that are either powered by the vehicle batteries or are electrically connected to a conventional ac power outlet known as shore power.

The type of APU most commonly used is a motor-driven generator that utilizes diesel or other fuel such as gasoline or liquid petroleum. Such APUs provide an immediate source of electrical power for vehicle hotel loads and are capable of generating sufficient power for operating high demand devices such as conventionally designed heating and air conditioning units, microwaves, washer/dryers, etc. However, APUs—especially those driven by diesel or gasoline engines—are noisy and expel pollutants into the atmosphere. Further, conventional APUs are relatively heavy, have a relatively high initial cost and present issues from the standpoint of maintenance costs, portability, and scheduling.

As an alternative to motor driven APUs, systems that solely rely on the vehicle batteries have been proposed. These systems that use the vehicle batteries to supply hotel loads primarily consist of wiring to interconnect DC powered hotel loads to the vehicle batteries and an inverter unit for transforming DC current drawn from the batteries to AC current for any AC powered hotel loads. Such systems are superior to the use of an APU from the standpoint of initial cost, weight, maintenance considerations and noise. However, systems powered solely by the vehicle batteries often are not capable of supplying the needed amount of current for the vehicle hotel loads for a sufficient or desired period of time without discharging the vehicle batteries to a point at which the vehicle cannot be started, among other problems.

To address such problems, some vehicles are equipped with an automatic engine restart (or automatic start/stop) system that automatically starts the engine when the vehicle batteries become discharged so that the alternator of the vehicle may recharge the batteries to a suitable level during hoteling. If an automatic engine restart comes, however, at an inappropriate moment in time, it can create discomfort for the operator, or might be violating local regulations on noise or emissions (e.g. silent area or green zone).

BRIEF SUMMARY

A method of controlling automatic engine restarts for an engine of a vehicle, the method may be summarized as including receiving, by at least one processor of the vehicle, an indication of an automatic engine restart inhibit period; storing, by the at least one processor, the received indication of the automatic engine restart inhibit period in at least one nontransitory processor-readable storage medium of the vehicle; and automatically controlling, by the at least one processor, the operation of the engine with alternator to charge a rechargeable electrical energy source of the vehicle to a determined level of charge at a time just prior to the start of the automatic engine start inhibit period. Automatically controlling the operation of the engine may include automatically controlling the operation of the engine with alternator to charge the rechargeable electrical energy source to a full level of charge at a time just prior to the start of the automatic engine start inhibit period.

The method may further include receiving, by the at least one processor, an indication of the determined level of charge to which the rechargeable electrical energy source should be charged at the time just prior to the start of the automatic engine restart inhibit period. Receiving an indication of the automatic engine restart inhibit period may include receiving an indication of the automatic engine restart inhibit period via a user interface communicatively coupled to the at least one processor. Receiving an indication of the automatic engine restart inhibit period may include receiving an indication of the automatic engine restart inhibit period via a remote computing device over a network. Receiving an indication of the automatic engine restart inhibit period may include receiving an indication of the automatic engine restart inhibit period via a remote user interface over a wireless network. Receiving an indication of the automatic engine restart inhibit period may include receiving an indication of a plurality of automatic engine restart inhibit periods that span a plurality of days. Automatically controlling the operation of the engine with alternator to charge the rechargeable electrical energy source may include automatically controlling the operation of the engine with alternator to charge the rechargeable electrical energy source while maximizing fuel efficiency. Automatically controlling the operation of the engine with alternator to charge the rechargeable electrical energy source may include automatically controlling the operation of the engine with alternator to charge the rechargeable electrical energy source while maximizing lifetime of the rechargeable electrical energy source. Automatically controlling the operation of the engine with alternator to charge the rechargeable electrical energy source may include automatically controlling the operation of the engine and alternator to charge the rechargeable electrical energy source while minimizing the running time of the engine of the vehicle. Automatically controlling the operation of the engine with alternator to charge the rechargeable electrical energy source may include automatically controlling the operation of the engine with alternator to charge the rechargeable electrical energy source while minimizing the noise or tailpipe emissions of the engine with alternator. Automatically controlling the operation of the engine with alternator to charge the rechargeable electrical energy source may include automatically controlling the operation of the engine with alternator to charge the rechargeable electrical energy source taking into account one or more regulations associated with running engines.

The method may further include predicting, by the at least one processor, whether the rechargeable electrical energy source will be able to maintain at least a minimum level of charge during the entire automatic engine restart inhibit period; and responsive to predicting that the rechargeable electrical energy source will not be able to maintain at least a minimum level of charge during the entire automatic engine restart inhibit period, causing a selection of a different automatic engine restart inhibit period. Predicting whether the rechargeable electrical energy source will be able to maintain at least a minimum level of charge during the entire automatic engine restart inhibit period may include receiving, by the at least one processor, impact data determined to potentially impact the operation of the rechargeable electrical energy source; analyzing, by the at least one processor, the received impact data; and predicting whether the rechargeable electrical energy source will be able to maintain at least a minimum level of charge during the entire automatic engine restart inhibit period based on the analysis of the received impact data. Receiving impact data may include receiving impact data that relates to at least one of an expected weather condition, an expected location of the vehicle, a time of day, an expected level of charge of the rechargeable electrical energy source, or an expected load coupled to the rechargeable electrical energy source during the automatic engine restart inhibit period. Receiving impact data may include receiving data relating to at least one of historical data for the vehicle, historical data for the operator of the vehicle, historical data for other operators, or historical data for other vehicles.

The method may further include receiving, by the at least one processor, a temperature condition indicative of a condition in which the engine is allowed to be started to charge the rechargeable electrical energy source during the automatic engine restart inhibit period; monitoring, by the at least one processor, the ambient temperature in the vehicle to determine whether the received temperature condition is met; and responsive to determining that the received temperature condition is met, automatically starting the engine to charge the rechargeable electrical energy source for a period of time during the automatic engine restart inhibit period.

The method may further include receiving, by the at least one processor, an indication that an operator of the vehicle is awake during the automatic engine restart inhibit period; and automatically starting, by the at least one processor, the engine with alternator to charge the rechargeable electrical energy source for a period of time. Receiving an indication that the operator of the vehicle is awake may include at least one of detecting that a light has been turned on, detecting that a display or speaker has been turned on by the operator, detecting movement by the operator, or detecting use of an electrical device by the operator.

A method of controlling an automatic engine restart system for an engine of a vehicle, the method may be summarized as including receiving, by at least one processor of the vehicle, an indication of an automatic engine restart inhibit period; storing, by the at least one processor, the received indication of the automatic engine restart inhibit period in at least one nontransitory processor-readable storage medium of the vehicle; determining, by the at least one processor, whether a current time is within the automatic engine restart inhibit period; responsive to determining that the current time is not within the automatic engine restart inhibit period, enabling, by the at least one processor, the automatic engine restart system to charge a rechargeable electrical energy source of the vehicle; and responsive to determining that the current time is within the automatic engine restart inhibit period, disabling, by the at least one processor, the automatic engine restart system.

The method may further include receiving, by the at least one processor, an indication that the rechargeable electrical energy source should be fully charged at the time just prior to the start of the automatic engine restart inhibit period; and causing, by the at least one processor, the automatic engine restart system to operate the engine to fully charge the rechargeable electrical energy source at the time just prior to the start of the automatic engine start inhibit period.

An automatic engine restart management system for a vehicle comprising an engine and a rechargeable electrical energy source, the automatic engine restart management system may be summarized as including at least one non-transitory processor-readable storage medium that stores at least one of processor-executable instructions or data; and at least one processor communicatively coupled to the at least one nontransitory processor-readable storage medium, in operation, the at least one processor receives an indication of an automatic engine restart inhibit period; stores the received indication of the automatic engine restart inhibit period in the at least one nontransitory processor-readable storage medium; and automatically controls the operation of the engine to charge the rechargeable electrical energy source of the vehicle to a determined level of charge at a time just prior to the start of the automatic engine start inhibit period. The at least one processor may receive an indication that the rechargeable electrical energy source should be fully charged at the time just prior to the start of the automatic engine restart inhibit period; and automatically controls the operation of the engine to fully charge the rechargeable electrical energy source at the time just prior to the start of the automatic engine start inhibit period. To automatically control the operation of the engine, the at least one processor may automatically control the operation of the engine to charge the rechargeable electrical energy source while one of maximizing fuel efficiency or minimizing the running time of the engine of the vehicle.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
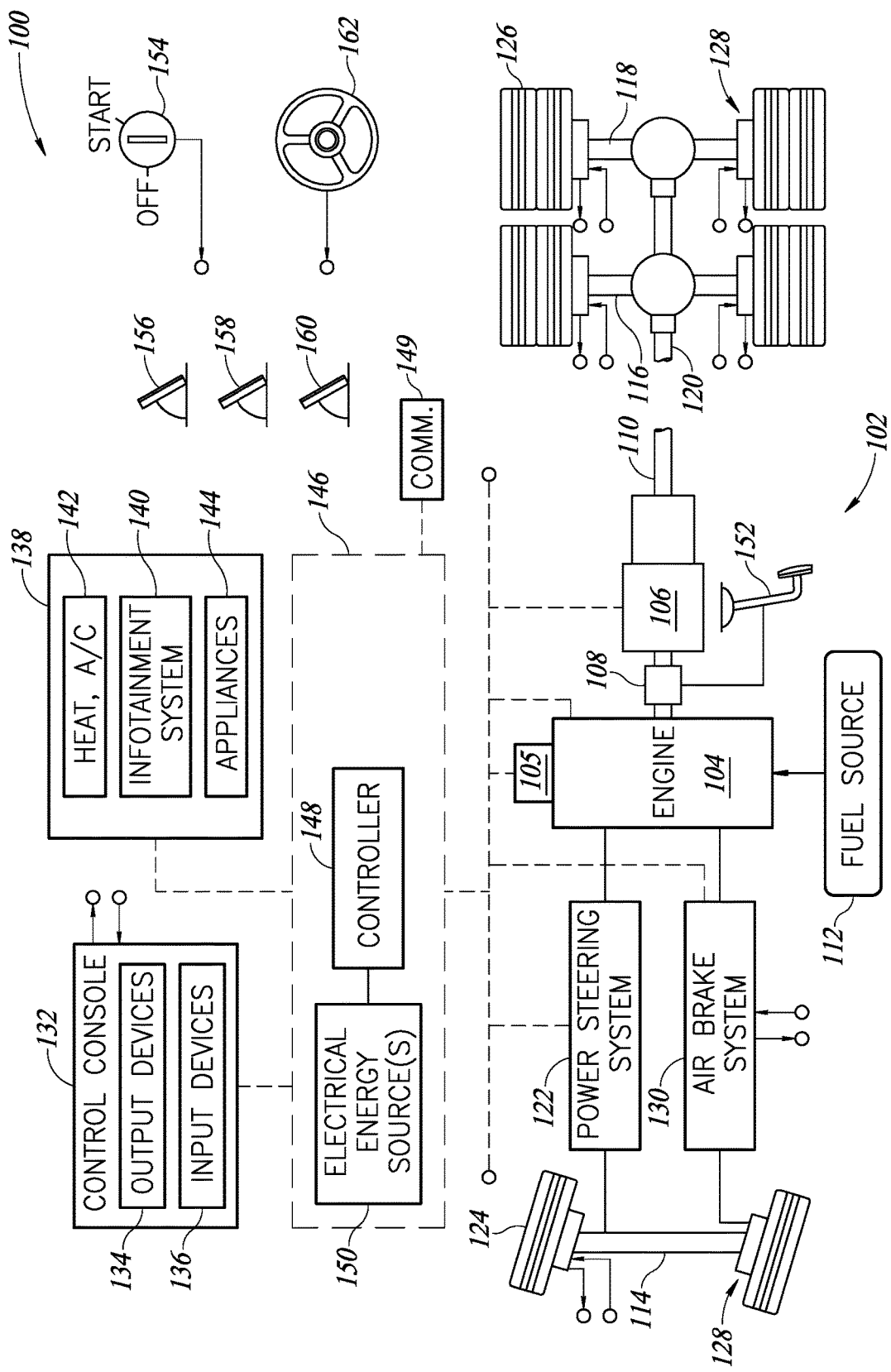
FIG. 1 is a schematic block diagram of a vehicle employing one embodiment of an automatic engine restart system, according to one non-limiting illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for managing or controlling an automatic engine restart system of a vehicle. In at least some implementations, the systems and methods are operative to disable automatic engine restarts during specified automatic engine restart inhibit periods to improve the comfort of the operator of the vehicle and others near the vehicle (e.g., during hoteling). For example, the operator may plan to sleep from 10:00 pm to 6:00 am, and may therefore inhibit engine restarts during that time period so that he or she is not awakened by the automatic starting of the engine during that time window. During times outside of the specified restart inhibit periods, the automatic engine restart system may control the automatic restarts to provide a determined level of charge, such as a full charge, for a rechargeable electrical energy source (e.g., one or more batteries) of the vehicle at a time just prior to the restart inhibit period so that the electrical energy source will be able to power various loads for an extended time during the restart inhibit period. For example, the system may fully charge the rechargeable electrical energy source by a time that is within 2 minutes, 5 minutes, 10 minutes, 20 minutes, 30 minutes, 60 minutes, etc., of the start of the restart inhibit period. The system includes a local or remote user interface that allows various parameters to be programmed. The system may also include an energy management system that optimizes the automatic engine restarts to achieve various goals, such as maximizing fuel efficiency, maximizing lifetime of the electrical energy source(s), minimizing noise of the engine with alternator or minimizing the running time of the engine. The various features of the systems and methods of the present disclosure are discussed further below with reference to the figures.

In at least some examples described herein, an automatic engine restart system may collect or analyze various information to implement the functionality of the present disclosure. Some of the information that may be collected or utilized includes but is not limited to programmable parameters, (planned) hours of vehicle operation, (historical) driver operation data for one or more drivers, load data, GPS location or topography data of planned routes, weather data, ambient temperature data, ambient humidity data, etc.

Although exemplary embodiments of the present disclosure are described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, marine vessels, generator sets, etc. Accordingly, the following descriptions and illustrations herein should be considered illustrative in nature, and thus, not limiting the scope of the present disclosure.

As briefly described above, embodiments of the present disclosure are directed to automatic engine restart systems and methods suitable for use in a vehicle. FIG. 1 shows a schematic block diagram of a vehicle 100, such as a Class 8 tractor or other vehicle, that includes a powertrain system 102. In the embodiment shown in FIG. 1, the powertrain system 102 includes an engine 104 (e.g., internal combustion engine), a transmission 106, and a clutch assembly 108. The transmission 106 may be a manual transmission, an automated manual transmission, or an automatic transmission that includes multiple forward gears, neutral and a reverse gear operatively connected to an output shaft 110. The clutch assembly 108 may be positioned between the engine 104 and the transmission 106 to selectively engage/disengage the engine from the transmission. The clutch assembly 108 may be actuated manually, pneumatically, hydraulically, electrically, or via any other suitable mechanism. In operation, the engine 104 receives fuel from a fuel source 112 and converts the energy of the fuel into output torque. The output torque of the engine 104 is converted via the transmission 106 into rotation of the output shaft 110.

The vehicle 100 also includes at least two axles such as a steer axle 114 and at least one drive axle, such as axles 116 and 118. The output shaft 110 of the transmission 106, which may include a vehicle drive shaft 120, is drivingly coupled to the drive axles 116 and 118 for transmitting the output torque generated by the engine 104 to the drive axles 116 and 118. The steer axle 114 is operatively coupled to a power steering system 122. The power steering system 122 may be powered hydraulically by an engine-mounted pump as shown in FIG. 1 or an electrical pump, or the power steering system may be fully electrical with no direct connection to the engine 104. In at least one embodiment, the power steering system 122 includes an electrically driven steering pump or it may be directly driven with no pump. The steer axle 114 supports corresponding front wheels 124 and the drive axles 116 and 118 support corresponding rear wheels 126, each of the wheels having service brake components 128. In at least some embodiments, the service brake components 128 include air brake components of an air brake system 130, such as an electrically driven compressor, compressed air supply/return lines, brake chambers, etc. In at least some implementations, the brake system may include hydraulic brakes. In at least some implementations, the brake system may utilize electrical air compressors that are not connected to the engine 104, or brakes that are directly electrically actuated without a pneumatic system. The service brake components 128 may also include wheel speed sensors, electronically controlled pressure valves, and the like, to effect control of the vehicle braking system.

The vehicle 100 may further include a cab mounted operator interface, such as a control console 132, which may include any of a number of output devices 134, such as lights, graphical displays, buzzers, speakers, gages, and the like, and various input devices 136, such as digital inputs, touchscreens, toggle switches, push button switches, potentiometers, or the like. The control console 132 may include multiple user interfaces, such as a first user interface in a front portion of the cab and a second user interface in a sleeper portion of the cab.

In at least some embodiments, the vehicle 100 may further include cab or sleeper mounted electrical systems 138 including an infotainment system 140, a heater and A/C system 142 (e.g., heater, A/C system, auxiliary A/C system), other appliances 144, such as a microwave, a coffee maker, television, electrical outlets for laptops, USB inputs, etc. At least some of these electrical systems may be referred to as "house loads." In at least some embodiments, the vehicle 100 may include a navigational device having GPS or other location capability, CD/DVD or other audio/visual functionality.

The vehicle 100 may include one or more wired or wireless communications systems 149, including radio frequency (RF) or infrared (IR) based communication links. The communications capabilities may include but are not limited to Universal Serial Bus (USB), 802.x (e.g., 802.11, 802.15, 802.16, etc.), cellular, dedicated short-range communications (DSRC), Bluetooth®/nearfield protocols, among others.

In order to start the engine 104, and to provide power to the control console 132 and other cab and/or sleeper mounted electrical systems 138, etc., the vehicle 100 also includes a power system 146, also referred to herein as a power and control system 146. The power system 146 in at least one embodiment includes a controller module or controller 148 and a rechargeable electrical energy source 150. The controller module 148 may include the automatic engine restart system of the present disclosure or may fully or partially implement the functionality of such system. The controller 148 may be operatively coupled to the various systems of the vehicle including, but not limited to the electrical energy source(s) 150, the engine 104, the transmission 106, the power steering system 122, the alternator 105, the communications system 106, the control console 132, the electrical systems 138, the brake system 130, etc.

The electrical energy source 150 may include electrical energy storage in the form of one or more batteries, one or more capacitors, one or more fuel cells, combinations thereof, etc. The batteries can be of the lead acid, NiCd, Lithium-ion type or can include any currently known or future developed rechargeable battery technology. The batteries may include starting batteries, deep cycle batteries, combinations thereof, etc. In at least some embodiments, the power system 146 may include one or more primary batteries for starting the engine and one or more auxiliary batteries for providing power to other loads during engine on and engine off conditions. In such embodiments, the auxiliary batteries may be combined with capacitors, fuel cells, electric power converters, etc., to provide power as needed. The batteries and systems may operate at one or more of a number of different voltage levels including, but not limited to, 12 V, 24 V, 48 V, 350 V, 650 V, etc.

As will be described in more detail below, the controller 148 in at least some embodiments can be used to manage the distribution of power to the associated loads of the vehicle. Further as will be described in more detail below, the controller 148 may include one or more algorithms that predict energy demands of the vehicle systems, determine the energy storage levels of the electrical energy storage, balance the energy in case of a combination of multiple energy storages and operate the power system in order to supply power to the systems of the vehicle 100 and prevent the battery from misuse (e.g. overcharging, undercharging, overload, etc.).

The power system 146 of the vehicle 100 may also include one or more DC/DC converters to supply direct current to any suitable DC load or to interconnect and balance multiple energy sources, and may optionally include one or more inverters to supply alternating current to any suitable AC loads. In at least some embodiments, the DC/DC converter reduces or increases the voltage it receives from electrical energy source 150, and outputs power at this lower or increased voltage to the appropriate loads. The DC/DC converter or inverter can output power to other electrical devices on the vehicle 100, including electric pumps, electric compressors, of the air brake system 130, the power steering system 122, or other vehicle systems, such as an electric PTO, etc., as will be described in more detail below. To aid in the distribution of power, additional components may be used, which are not shown but well known in the art, including distribution blocks, distribution panels, fuse blocks, relays, contactors and/or the like.

The vehicle 100 may also include conventional operator control inputs, such as a clutch pedal 152 (in some manual systems), an ignition or start switch 154, a throttle or an accelerator pedal 156, a service brake pedal 158, a parking brake 160 and a steering wheel 162 to effect turning of the front wheels 124 and/or wheels on other axles of the vehicle 100.

While the vehicle 100 of FIG. 1 may employ a powertrain utilizing an internal combustion engine as the vehicle motive force, the vehicle represents only one of the many possible applications for the systems and methods of the present disclosure. It should be appreciated that aspects of the present disclosure transcend any particular type of land or marine vehicle and any type of powertrain. For example, the vehicle 100 may employ a hybrid powertrain with the prime mover a combustion engine, fuel cell stack, etc.

Figure 2:
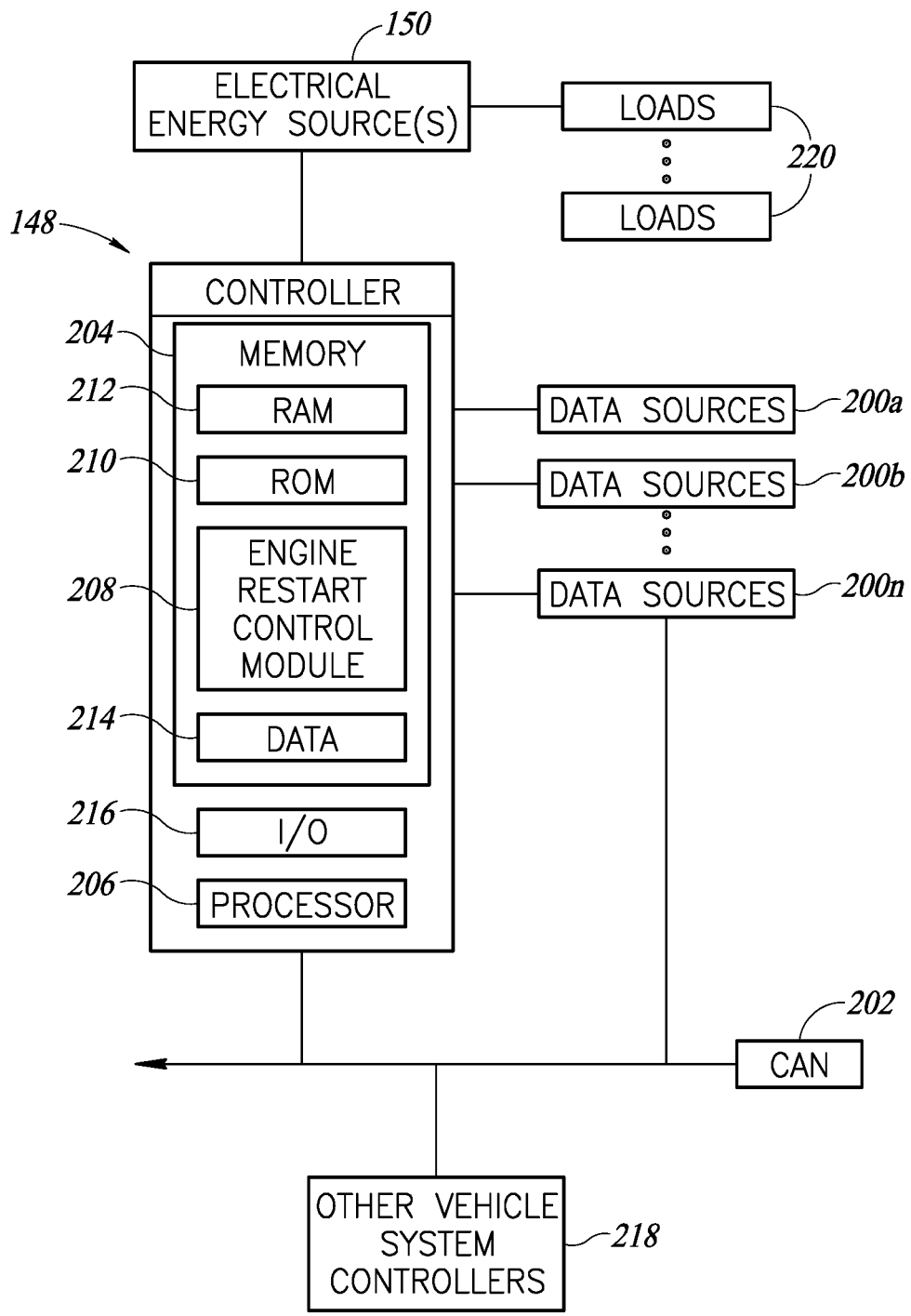
FIG. 2 is a schematic block diagram of an automatic engine restart system, according to one non-limiting illustrated implementation.

FIG. 2 shows one non-limiting example of the controller 148 formed in accordance with aspects of the present disclosure. The controller 148 is connected in electrical communication with a plurality of data sources 200a-200n (generally, data sources 200). As will be described in more detail below, the data sources 200 may include but are not limited to navigation equipment, communications devices, on-board sensors, on-board state estimators, etc. It will be appreciated that the controller 148 can be connected directly (wired or wirelessly) to the plurality of data sources 200 or indirectly via any suitable interface, such as a CAN interface 202. Those skilled in the art and others will recognize that the CAN 202 may be implemented using any number of different communication protocols such as, but not limited to, Society of Automotive Engineers ("SAE") J1587, SAE J1922, SAE J1939, SAE J1708, and combinations thereof. The controller 148 may also communicate with other electronic components of the vehicle 100 via the CAN 202 for collecting data from other electronic components to be utilized by the controller 148, and as such, can also be considered in at least some embodiments as data sources 200. For example, the controller 148 may receive data from one or more other controllers 218, such as an engine controller, a transmission controller, a brake system controller, etc. In operation, as will be described in more detail below, the controller 148 receives signals from the data sources 200, processes such signals and others, and depending on the processed signals, transmits suitable control signals for operating the engine 104, the alternator 105, the power system 146, or other components of the vehicle 100. The controller 148 initiates operation by means of a hard wired input (e.g. ignition key 154) or by receiving a signal from a communication network (e.g. wake-up on CAN). This wake-up message allows to bring the controller 148 in operation, whereas the operator does not need to use the ignition keys or be physically in or near the vehicle 100. The controller 148 may be a standalone controller or may be part of one or more other controllers (e.g., vehicle electronic control unit (VECU)) of the vehicle 100. Generally, the automatic engine restart system may be implemented in any local or remote controller(s) operative to provide the functionality described herein.

In at least some embodiments, the controller 148 may contain logic rules implemented in a variety of combinations of hardware circuitry components and programmed processors to effect control of the power system 146 and other systems of the vehicle 100. To that end, as further illustrated in FIG. 2, one suitable embodiment of the controller 148 includes a nontransitory memory 204, a processor 206, and an automatic engine restart control module 208 for providing functionality of the controller 148. The memory 204 may include computer readable storage media in read-only memory (ROM) 210 and random-access memory (RAM) 212, for example. The computer-readable storage media may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, including data 214 (e.g., programmable parameters). The controller 148 also includes one or more input/output devices or components 216 that enable the controller to communicate with one or more local or remote devices via wired or wireless communication. In at least some embodiments, the controller 148 may include additional components including but not limited to a high speed clock, analog to digital (A/D) and digital to analog (D/A) circuitry, other input/output circuitry and devices (I/O), and appropriate signal conditioning and buffer circuitry.

As used herein, the term processor is not limited to integrated circuits referred to in the art as a computer, but broadly refers to one or more of a microcontroller, a microcomputer, a microprocessor, a central processing unit (CPU), a graphics processing unit (GPU), a programmable logic controller, an application specific integrated circuit, other programmable circuits, combinations of the above, among others. In at least one embodiment, the processor 206 executes instructions stored in memory 204, such as engine restart control module 208, to implement the functionality described in the present disclosure.

The automatic engine restart control module 208 may include a set of control algorithms, including program instructions, selectable parameters, and calibrations stored in one of the storage media and executed to provide functions described herein. Information transfer to and from the module 208 may be accomplished by way of a direct connection, a local area network bus, a serial peripheral interface bus, wired or wireless interfaces, etc. The algorithms may be executed during preset loop cycles such that each algorithm is executed at least once each loop cycle. Algorithms stored in the non-volatile memory devices may be executed by the processor 206 to monitor inputs from the sensing devices and other data transmitting devices or polls such devices for data to be used therein. Loop cycles may be executed at regular intervals during ongoing operation of the vehicle 100. Alternatively or additionally, algorithms may be executed in response to the occurrence of one or more events.

The processor 206 communicates with various data sources 200 directly or indirectly via the input/output (I/O) interface 216 and suitable communication links. The interface 216 may be implemented as a one or more integrated interfaces that provide various raw data or signal conditioning, processing, and/or conversion, short-circuit protection, and/or the like. Additionally or alternatively, one or more dedicated hardware or firmware chips may be used to condition and process particular signals before being supplied to the processor 206. In at least some embodiments, the signals transmitted from the interface 216 may be suitable digital or analog signals.

The controller 148 may be a separate controller that implements the automatic engine restart functionality described herein. However, it should be appreciated that the controller 148 may be a controller module, which could be software embedded within an existing on-board controller, such as the engine controller, a general purpose controller, other vehicle system controllers, etc.

As briefly described above, the data sources 200 can include but are not limited to on-board sensors, navigation/GPS devices, communications devices, data stores, remote servers, etc. These data sources and others in at least some embodiments may be part of the electrical systems 138, control console 132, etc., described above. The data supplied from these data sources 200 and others may generally or specifically relate to vehicle operating parameters, operator driving trends and accessories (e.g., loads 220) usage patterns and characteristics, and external parameters, including present vehicle navigation, traffic patterns, weather data, sunrise and sunset data, temperature data, among others.

Figure 3:
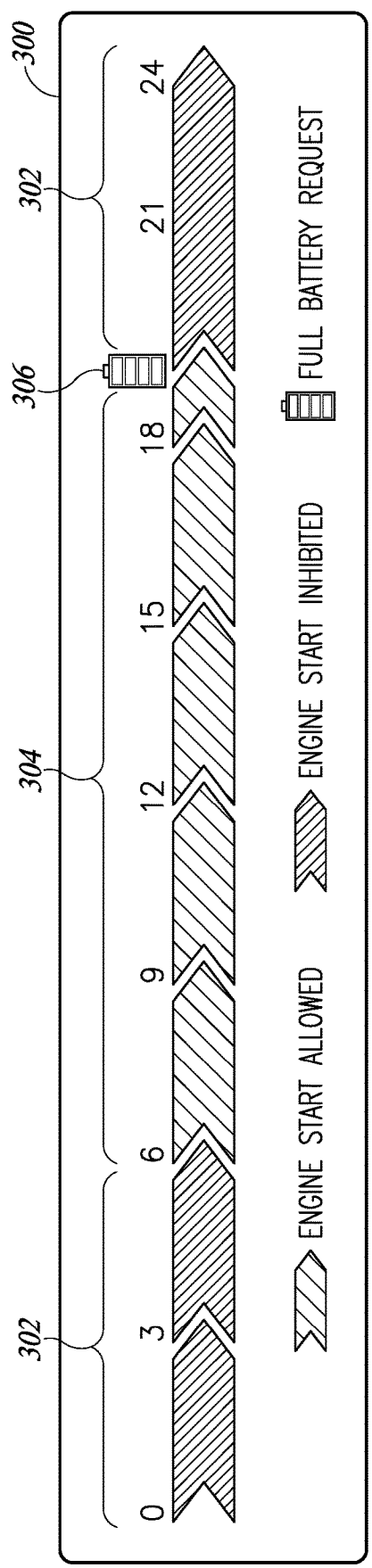
FIG. 3 is a diagram of a graphical user interface for an automatic engine restart system, according to one non-limiting illustrated implementation.

FIG. 3 depicts an illustrative example of a user interface 300 that provides a 24 hour programmable timer. The user interface 300 allows the driver or other person or device to program what times automatic restarts of the engine are allowed and what times automatic restarts are not allowed. In the illustrated example, the driver or other entity has indicated that engine restarts are not allowed during a period 302 that extends from approximately 7:00 pm (19:00) to 6:00 am (6:00). Engine restarts are allowed during the period 304 that extends between 6:00 am (6:00) and 7:00 pm (19:00). Further, for each time window where engine starts are not allowed, the operator may indicate whether a fully charged battery is needed at the start of the time window. In the illustrated example, a full battery icon 306 positioned at the start of the inhibit period 302 is used to indicate that the driver has requested a full battery charge at the beginning of the restart inhibit period 302.

The user interface 300 is provided as a non-limiting example user interface. In at least some implementations, the automatic engine restart system may provide a user interface that includes different information than that shown in FIG. 3. For example, the user interface 300 may provide a timer that covers a plurality of days (e.g., weeks, months). Further, a user interface may include graphical information (e.g., bars, needles, animations) or other interface elements to effectively communicate information to the operator. Additionally or alternatively, the automatic engine restart system may include an audio user interface (e.g., speaker, microphone) that receives control input via voice commands and provides information via audio (e.g., voice notifications, chimes).

In at least some implementations, the user interface 300 is implemented as an App (e.g., for Android, iOS or Windows Mobile operating system) on a smart phone, tablet, or other computing device communicating with the controller 148 via cellular communication or other wireless communication.

Figure 4:
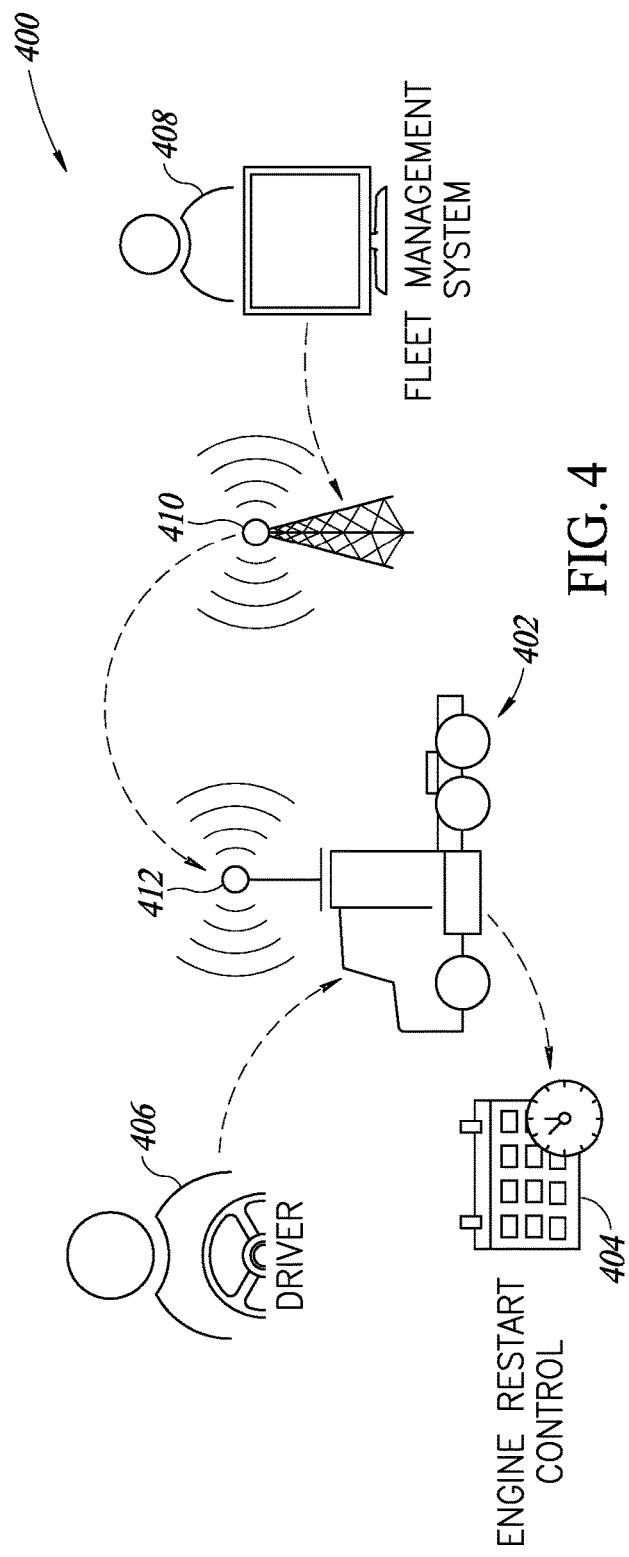
FIG. 4 is a schematic block diagram that depicts example interfaces for interacting with an automatic engine restart system, according to one non-limiting illustrated implementation.

FIG. 4 shows a schematic diagram of an environment 400 in which an automatic engine restart system 404 may be implemented for a vehicle 402. In the illustrated example, the automatic engine restart system 404 may be programmed by the driver 406 of the vehicle through a suitable interface, as discussed above. Additionally or alternatively, the automatic engine restart system 404 may be programmed remotely via a fleet management system 408 that communicates with the controller (e.g., controller 148) via wireless communication. In the example shown, the fleet management system 408 may communicate with a vehicle controller via cellular communication or other wireless communication though antennas 410 and 412 (e.g., cellular antennas).

In at least some implementations, the automatic engine restart system may implement an energy management algorithm that optimizes for one or more criteria. For example, the automatic engine restart system may schedule moments when to restart the engine and recharge the rechargeable energy source to achieve different objectives, such as maximizing fuel efficiency, maximizing lifetime of the electrical energy source(s), minimizing noise of the engine with alternator, minimizing engine running time, etc. These objectives may be programmable by the operator, by a fleet management system, or by other entity.

Further, in at least some implementations, the automatic engine restart system may check if the requested time windows when engine restarts are not allowed are feasible (e.g., whether sufficient energy can be stored in the rechargeable energy source in advance of the time window, whether the duration of the time window is too long given known or predicted conditions). This feature may take into account the current level of charge in the energy source, the time available to recharge the energy source prior to the inhibit period, the duration of the inhibit period, the expected weather, expected loads, operator preferences, etc. Responsive to determining that the selected inhibit period is not feasible, the system may proposed alternate time periods that are achievable.

Additionally or alternatively, the system may allow the operator to select one or more tradeoffs to achieve a longer inhibit period. As a non-limiting example, the system may allow the user to select a temperature range in which the system will turn off or reduce the power consumption of a heater or air conditioner to extend the duration of the inhibit period even though the temperature will vary from a set temperature. For instance, in a cold environment, the user may set the temperature at 70 degrees, and specify that, if needed, the system can turn off the heater or reduce its power consumption and continue to inhibit engine restarts during the inhibit period as long as the temperature does not drop below 64 degrees. In that case, the system may be able to extend the inhibit period longer than the case where the temperature must be maintained at 70 degrees throughout the entire period. Other tradeoffs may include reducing or turning off one or more loads under certain conditions to extend the automatic restart inhibit period. In at least some implementations, the system may provide choices for the operator to select to meet the operator's particular preferences.

Figure 5:
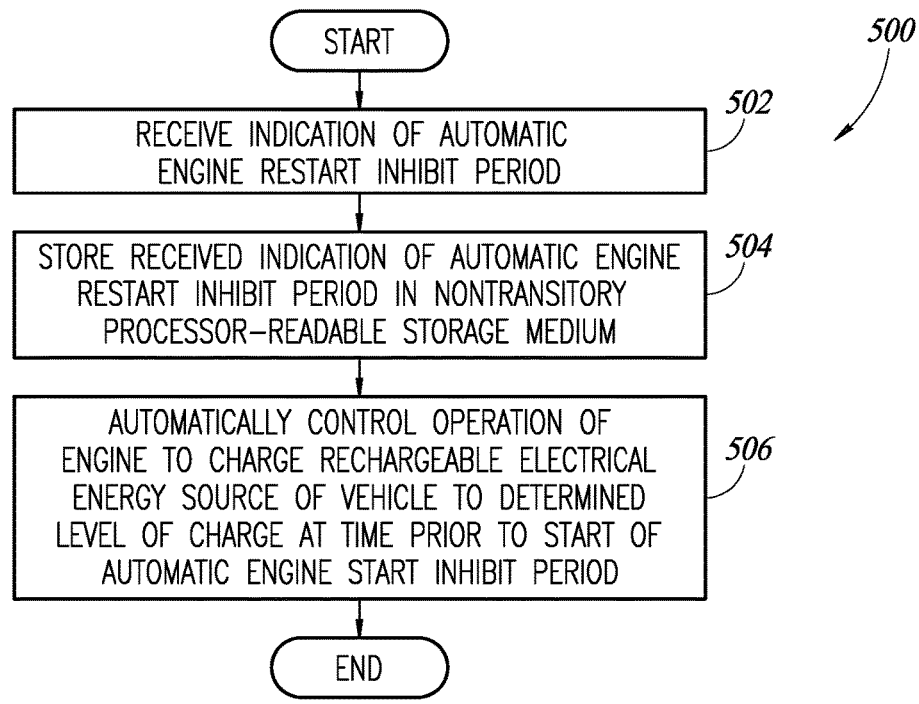
FIG. 5 is a flow diagram for a method of operating an automatic engine restart system, according to one non-limiting illustrated implementation.

Referring now to FIG. 5, there is shown a flow diagram of one example method 500 carried out by a controller (e.g., controller 148) of a vehicle to implement an automatic engine restart system of the present disclosure. As shown in FIG. 5, the method 500 begins at 502, wherein the controller receives an indication of an automatic engine restart inhibit period. As discussed above, the controller may also receive other parameters, such as an indication of the determined level of charge to which the rechargeable electrical energy source should be charged at the time just prior to (e.g., 0-30 minutes prior to) the start of the automatic engine restart inhibit period. For example, the indication may specify that the rechargeable electrical energy source should be fully charged, 80% charged, 90% charged, etc. The indication may specify one or more inhibit periods for one day or for a plurality of days (e.g., weeks, months).

The controller may receive various inputs from any suitable interface communicatively coupled to the controller, such as control panel located in the cab or sleeper of the vehicle, or via a computing device positioned nearby (e.g., operator's smartphone) or remote (e.g., remote server) from the vehicle.

At 504, the controller stores the received indication of the automatic engine restart inhibit period and any other parameters in at least one nontransitory processor-readable storage medium of the controller or communicatively coupled to the controller.

At 506, the controller automatically controls the operation of the engine to charge a rechargeable electrical energy source of the vehicle to a determined level of charge (e.g., full charge, 90% charge) at a time just prior to the start of the automatic engine start inhibit period. As discussed above, the controller may control the operation of the engine to cause the alternator to charge the rechargeable electrical energy source while achieving one or more objectives, such as maximizing fuel efficiency or minimizing the running time of the engine of the vehicle. As an example, it may be more fuel efficient to charge the rechargeable electrical energy source to a level less than fully charged, such as 90% or 95% charged, since the charging process is relatively slow when the energy source is nearly fully charged.

In at least some implementations, the controller may predict whether the rechargeable electrical energy source will be able to maintain at least a minimum level of charge during the entire automatic engine restart inhibit period. For example, the controller may predict whether the energy source will be able to maintain a level of charge sufficient to start the vehicle at the end of the restart inhibit period. Responsive to predicting that the rechargeable electrical energy source will not be able to maintain at least a minimum level of charge during the entire automatic engine restart inhibit period, the controller may cause a selection of a different automatic engine restart inhibit period. For example, the controller may provide one or more alternatives to the indicated inhibit period for the user to select.

In at least some implementations, to predict whether the rechargeable electrical energy source will be able to maintain at least a minimum level of charge during the entire automatic engine restart inhibit period, the controller may receive impact data determined to potentially impact the operation of the rechargeable electrical energy source, analyze the received impact data, and predict whether the rechargeable electrical energy source will be able to maintain at least a minimum level of charge during the entire automatic engine restart inhibit period based on the analysis of the received impact data. As non-limiting examples, the impact data may include data that relates to at least one of: an expected weather condition, an expected location of the vehicle, a time of day, an expected level of charge of the rechargeable electrical energy source, an expected load coupled to the rechargeable electrical energy source during the automatic engine restart inhibit period, historical data for the vehicle, historical data for the operator of the vehicle, historical data for other operators, historical data for other vehicles, etc.

In at least some implementations, the controller may receive a temperature condition indicative of a condition in which the engine is allowed to be started to charge the rechargeable electrical energy source during the automatic engine restart inhibit period. The controller may monitor the ambient temperature in the vehicle to determine whether the received temperature condition is met. Responsive to determining that the received temperature condition is met, the controller may automatically start the engine to charge the rechargeable electrical energy source for a period of time during the automatic engine restart inhibit period.

In at least some implementations, the controller may receive an indication that the operator of the vehicle is awake during the automatic engine restart inhibit period. Responsive to determining that the operator is awake, the controller may automatically start the engine to charge the rechargeable electrical energy source for a period of time while the operator is determined to be awake since the starting of the engine would not awaken the operator from sleep. The controller may use any type of data to detect that the operator is likely to be awake. Non-limiting examples of indications that may be used to detect that the operator is awake include: detecting that a light has been turned on, detecting that a display or speaker has been turned on by the operator, detecting movement by the operator, detecting use of an electrical device by the operator, etc.

Figure 6:
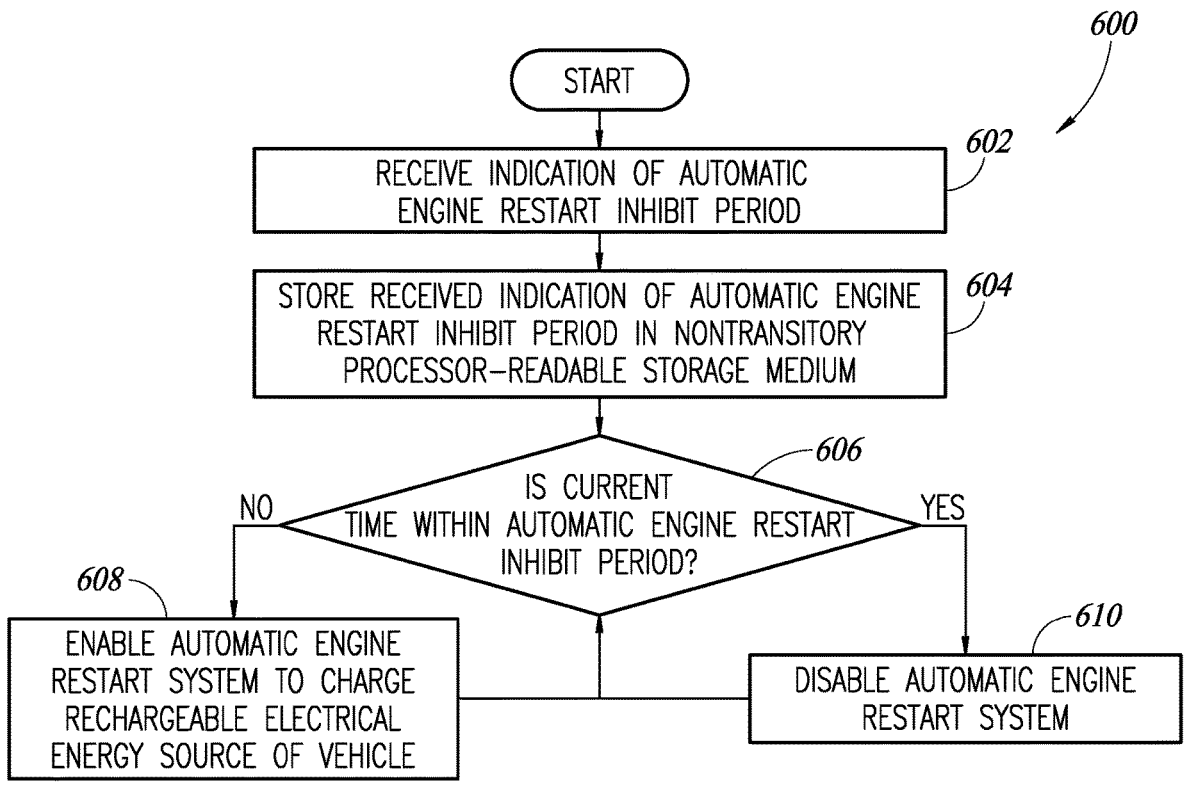
FIG. 6 is a flow diagram for another method of operating an automatic engine restart system, according to one non-limiting illustrated implementation.

Referring now to FIG. 6, there is shown a flow diagram of one example method 600 carried out by a controller (e.g., controller 148) of a vehicle to implement an automatic engine restart system of the present disclosure. As shown in FIG. 6, the method 600 begins at 602, wherein the controller receives an indication of an automatic engine restart inhibit period. As discussed above, the controller may receive additional parameters, such as the level of charge required at the start of the inhibit period, various override conditions, tradeoff decision criteria, etc.

At 604, the controller may store the received indication of the automatic engine restart inhibit period and any other parameters in at least one nontransitory processor-readable storage medium of the controller or communicatively coupled to the controller.

At 606, the controller may determine whether a current time is within the automatic engine restart inhibit period. At 608, responsive to determining that the current time is not within the automatic engine restart inhibit period, the controller may enable the automatic engine restart system to allow the system to control the engine to charge a rechargeable electrical energy source of the vehicle. As discussed above, the controller may optimize the restarts to achieve certain objectives. At 610, responsive to determining that the current time is within the automatic engine restart inhibit period, the controller may disable the automatic engine restart system until the inhibit period has passed, wherein the controller may again enable the automatic engine restart system.

In at least some implementations, at least one local or remote processor may cause a record of the start inhibit times to be stored in memory. The record may be checked wirelessly or directly by one or more entities, such as authorities verifying compliance with regulations. Further, in at least some implementations, the automatic restart inhibit calculations may take into account regulatory requirements that may be location based, time based, or both. For example, the system may utilize GPS data and geo-fencing to determine permissible or desired start/stop times and locations. Further, the system may receive a DSRC or locally targeted message (e.g., cellular message) that indicates one or more requests or rules relating to start/stop times or locations. The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An automatic engine restart management system for a vehicle comprising an engine and a rechargeable electrical energy source, the automatic engine restart management system comprising:
at least one nontransitory processor-readable storage medium that stores at least one of processor-executable instructions or data; and
at least one processor communicatively coupled to the at least one nontransitory processor-readable storage medium, in operation, the at least one processor:
receives an indication of an automatic engine restart inhibit period;
stores the received indication of the automatic engine restart inhibit period in the at least one nontransitory processor-readable storage medium; and
automatically controls the operation of the engine to charge the rechargeable electrical energy source of the vehicle to a determined level of charge at a time just prior to the start of the automatic engine start inhibit period.

2. The automatic engine restart management system of claim 1 wherein the at least one processor:
receives an indication that the rechargeable electrical energy source should be fully charged at the time just prior to the start of the automatic engine restart inhibit period; and
automatically controls the operation of the engine to fully charge the rechargeable electrical energy source at the time just prior to the start of the automatic engine start inhibit period.

3. The automatic engine restart management system of claim 1 wherein, to automatically control the operation of the engine, the at least one processor automatically controls the operation of the engine to charge the rechargeable electrical energy source while one of maximizing fuel efficiency or minimizing the running time of the engine of the vehicle.

4. A method of controlling automatic engine restarts for an engine of a vehicle, the method comprising:
receiving, by at least one processor of the vehicle, an indication of an automatic engine restart inhibit period;
storing, by the at least one processor, the received indication of the automatic engine restart inhibit period in at least one nontransitory processor-readable storage medium of the vehicle; and
automatically controlling, by the at least one processor, the operation of the engine with alternator to charge a rechargeable electrical energy source of the vehicle to a determined level of charge at a time just prior to the start of the automatic engine start inhibit period.

5. The method of claim 4 wherein automatically controlling the operation of the engine comprises automatically controlling the operation of the engine with alternator to charge the rechargeable electrical energy source to a full level of charge at a time just prior to the start of the automatic engine start inhibit period.

6. The method of claim 4, further comprising:
receiving, by the at least one processor, an indication of the determined level of charge to which the rechargeable electrical energy source should be charged at the time just prior to the start of the automatic engine restart inhibit period.

7. The method of claim 4 wherein receiving an indication of the automatic engine restart inhibit period comprises receiving an indication of the automatic engine restart inhibit period via a user interface communicatively coupled to the at least one processor.

8. The method of claim 4 wherein receiving an indication of the automatic engine restart inhibit period comprises receiving an indication of the automatic engine restart inhibit period via a remote computing device over a network.

9. The method of claim 4 wherein receiving an indication of the automatic engine restart inhibit period comprises receiving an indication of the automatic engine restart inhibit period via a remote user interface over a wireless network.

10. The method of claim 4 wherein receiving an indication of the automatic engine restart inhibit period comprises receiving an indication of a plurality of automatic engine restart inhibit periods that span a plurality of days.

11. The method of claim 4 wherein automatically controlling the operation of the engine with alternator to charge the rechargeable electrical energy source comprises automatically controlling the operation of the engine with alternator to charge the rechargeable electrical energy source while maximizing fuel efficiency.

12. The method of claim 4 wherein automatically controlling the operation of the engine with alternator to charge the rechargeable electrical energy source comprises automatically controlling the operation of the engine with alternator to charge the rechargeable electrical energy source while maximizing lifetime of the rechargeable electrical energy source.

13. The method of claim 4 wherein automatically controlling the operation of the engine with alternator to charge the rechargeable electrical energy source comprises automatically controlling the operation of the engine and alternator to charge the rechargeable electrical energy source while minimizing the running time of the engine of the vehicle.

14. The method of claim 4 wherein automatically controlling the operation of the engine with alternator to charge the rechargeable electrical energy source comprises automatically controlling the operation of the engine with alternator to charge the rechargeable electrical energy source while minimizing the noise or tailpipe emissions of the engine with alternator.

15. The method of claim 4 wherein automatically controlling the operation of the engine with alternator to charge the rechargeable electrical energy source comprises automatically controlling the operation of the engine with alternator to charge the rechargeable electrical energy source taking into account one or more regulations associated with running engines.

16. The method of claim 4, further comprising:
predicting, by the at least one processor, whether the rechargeable electrical energy source will be able to maintain at least a minimum level of charge during the entire automatic engine restart inhibit period; and
responsive to predicting that the rechargeable electrical energy source will not be able to maintain at least a minimum level of charge during the entire automatic engine restart inhibit period, causing a selection of a different automatic engine restart inhibit period.

17. The method of claim 16 wherein predicting whether the rechargeable electrical energy source will be able to maintain at least a minimum level of charge during the entire automatic engine restart inhibit period comprises:
receiving, by the at least one processor, impact data determined to potentially impact the operation of the rechargeable electrical energy source;
analyzing, by the at least one processor, the received impact data; and
predicting whether the rechargeable electrical energy source will be able to maintain at least a minimum level of charge during the entire automatic engine restart inhibit period based on the analysis of the received impact data.

18. The method of claim 17 wherein receiving impact data comprises receiving impact data that relates to at least one of: an expected weather condition, an expected location of the vehicle, a time of day, an expected level of charge of the rechargeable electrical energy source, or an expected load coupled to the rechargeable electrical energy source during the automatic engine restart inhibit period.

19. The method of claim 17 wherein receiving impact data comprises receiving data relating to at least one of: historical data for the vehicle, historical data for the operator of the vehicle, historical data for other operators, or historical data for other vehicles.

20. The method of claim 4, further comprising:
receiving, by the at least one processor, a temperature condition indicative of a condition in which the engine is allowed to be started to charge the rechargeable electrical energy source during the automatic engine restart inhibit period;
monitoring, by the at least one processor, the ambient temperature in the vehicle to determine whether the received temperature condition is met; and
responsive to determining that the received temperature condition is met, automatically starting the engine to charge the rechargeable electrical energy source for a period of time during the automatic engine restart inhibit period.

21. The method of claim 4, further comprising:
receiving, by the at least one processor, an indication that an operator of the vehicle is awake during the automatic engine restart inhibit period; and
automatically starting, by the at least one processor, the engine with alternator to charge the rechargeable electrical energy source for a period of time.

22. The method of claim 21 wherein receiving an indication that the operator of the vehicle is awake comprises at least one of: detecting that a light has been turned on, detecting that a display or speaker has been turned on by the operator, detecting movement by the operator, or detecting use of an electrical device by the operator.

23. A method of controlling an automatic engine restart system for an engine of a vehicle, the method comprising:
receiving, by at least one processor of the vehicle, an indication of an automatic engine restart inhibit period;
storing, by the at least one processor, the received indication of the automatic engine restart inhibit period in at least one nontransitory processor-readable storage medium of the vehicle;
determining, by the at least one processor, whether a current time is within the automatic engine restart inhibit period;
responsive to determining that the current time is not within the automatic engine restart inhibit period, enabling, by the at least one processor, the automatic engine restart system to charge a rechargeable electrical energy source of the vehicle; and
responsive to determining that the current time is within the automatic engine restart inhibit period, disabling, by the at least one processor, the automatic engine restart system.

24. The method of claim 23, further comprising
receiving, by the at least one processor, an indication that the rechargeable electrical energy source should be fully charged at the time just prior to the start of the automatic engine restart inhibit period; and
causing, by the at least one processor, the automatic engine restart system to operate the engine to fully charge the rechargeable electrical energy source at the time just prior to the start of the automatic engine start inhibit period.

* * * * *